US006362544B2

United States Patent
Johnston et al.

(10) Patent No.: US 6,362,544 B2
(45) Date of Patent: Mar. 26, 2002

(54) ELECTROMAGNETIC DEVICE WITH EMBEDDED WINDINGS AND METHOD FOR ITS MANUFACTURE

(75) Inventors: Ralph Johnston, Anderson; Chahee Peter Cho, Carmel; Ronald A. Martin, Pendleton, all of IN (US)

(73) Assignee: Delco Remy International, Inc., Anderson, IN (US)

( * ) Notice: Subject to any disclaimer, the term of this patent is extended or adjusted under 35 U.S.C. 154(b) by 0 days.

(21) Appl. No.: 09/845,374

(22) Filed: Apr. 30, 2001

Related U.S. Application Data

(63) Continuation of application No. 09/533,915, filed on Mar. 23, 2000, now Pat. No. 6,232,681.

(51) Int. Cl.[7] .......................... H02K 15/02; H02K 15/06
(52) U.S. Cl. ............................ 310/44; 310/42; 310/45; 310/179; 310/254; 29/596
(58) Field of Search .................... 310/42, 43, 44, 310/45, 67 R, 179, 254, 258, 259; 29/596

(56) References Cited

U.S. PATENT DOCUMENTS

| | | | |
|---|---|---|---|
| 3,848,331 A | * 11/1974 | Pavlik et al. .................. 310/44 |
| 4,823,032 A | 4/1989 | Ward et al. .................... 310/43 |
| 4,947,065 A | 8/1990 | Ward et al. .................... 310/44 |
| 4,956,011 A | 9/1990 | Nishida et al. ................ 75/230 |
| 4,961,016 A | 10/1990 | Peng et al. .................... 310/62 |
| 5,004,577 A | 4/1991 | Ward ............................ 264/112 |
| 5,015,982 A | 5/1991 | Skinner et al. ................ 336/69 |
| 5,105,115 A | * 4/1992 | Shinryo et al. ................ 310/44 |
| 5,121,021 A | 6/1992 | Ward ............................ 310/154 |
| 5,210,493 A | 5/1993 | Schroeder et al. ........... 324/252 |
| 5,211,896 A | 5/1993 | Ward et al. .................... 264/126 |
| 5,221,503 A | 6/1993 | Ward et al. .................... 264/104 |
| 5,250,255 A | 10/1993 | Sagawa et al. ................ 419/39 |
| 5,397,953 A | 3/1995 | Cho ............................. 310/254 |
| 5,405,574 A | 4/1995 | Chelluri et al. ................ 419/47 |
| 5,472,662 A | 12/1995 | Yano et al. .................... 419/38 |
| 5,536,985 A | 7/1996 | Ward et al. .................... 310/44 |
| 5,589,010 A | 12/1996 | Gay ............................. 148/306 |
| 5,591,373 A | 1/1997 | Ward et al. ................. 252/62.54 |
| 5,680,692 A | * 10/1997 | Kliman et al. ................ 310/44 |
| 5,689,797 A | 11/1997 | Chelluri et al. ................ 419/38 |
| 5,691,681 A | 11/1997 | Okugawa ..................... 335/284 |
| 5,735,679 A | 4/1998 | Hutchins ...................... 418/179 |
| 5,772,748 A | 6/1998 | Hubbard ................... 106/38.27 |

\* cited by examiner

*Primary Examiner*—Burton S. Mullins
(74) *Attorney, Agent, or Firm*—Ice Miller; Thomas A. Walsh; Jay G. Taylor

(57) ABSTRACT

A powdered magnetic material stator core with embedded stator windings and a method for its manufacture. Embedding the windings within a radially compacted powdered magnetic material stator core enables equivalent or better electromagnetic performance in a significantly reduced size. Radial compaction of the powdered magnetic material minimizes the distortion of the stator windings during compaction.

20 Claims, 5 Drawing Sheets

ELECTROMAGNETIC DEVICE WITH EMBEDDED WINDINGS AND METHOD FOR ITS MANUFACTURE

This application is a continuation of U.S. application Ser. No. 09/533,915, filed Mar. 23, 2000 now U.S. Pat. No. 6,232,681.

BACKGROUND OF THE INVENTION

1. Field of the Invention

This invention relates to the field of electromagnetic device design and manufacturing.

2. Description of the Prior Art

An electromagnetic device, such as an electric motor or an electric generator, contains two electromagnetic components: a stationary component known as a "stator," and a rotating component known as a "rotor." In the most common embodiment, the rotor and the stator are cylindrical in shape. The cylindrical rotor is installed inside the hollow, cylindrical stator in such a way that when the rotor rotates, the outer surface of the rotor is proximate to, but does not touch, the inner surface of the stator. The space between the outer surface of the rotor and the inner surface of the stator is known as the "air gap".

It is known in the art that a stator and a rotor each may be manufactured from a core made from a magnetic material, around which or within which insulated electrical conductors known as "windings" are installed. The rotor core and stator core together form the magnetic "flux path" for the electromagnetic device.

A typical stator of a design known in the art is comprised of a hollow, cylindrical core, the inner surface of which contains slots which extend the full length of the core parallel to the axial direction of the core. The portions of the stator core between the slots are known as the "teeth." The measurement made by adding the width of one slot measured at the base of the slot to the width of one adjacent tooth is known as the "slot pitch".

The prior art stator windings are inserted in the slots in the core, usually by a manual means. After the stator windings are installed into the stator core, the stator may be finished by filling the remaining volume of the stator slots and coating the external surface of the stator with a non-reactive, non-conducting material such as, for example, varnish or epoxy. The non-reactive, non-conducting material serves to protect the stator from corrosion, and to prevent the stator windings from moving within the stator slots during use. Such movement, if permitted, could damage the electrical insulation on the stator windings, and/or could alter the electromagnetic characteristics of the stator.

It is well known in the art to manufacture a stator core from sheet steel. Steel laminations are punched from the sheet steel. The punched steel laminations include slots, alignment holes, and other assembly features. The punched steel laminations are stacked so that the inner surface of the core, the outer surface of the core, the slots, and the alignment holes are aligned. The stacked steel laminations then are secured together by methods known in the art including, for example, welding or riveting.

The method of manufacturing a stator core from sheet steel laminations possesses several disadvantages. The process of punching the steel laminations from the sheet steel creates scrap steel pieces, which often cannot be used productively by the manufacturer. In addition to the cost of the wasted sheet steel pieces, often the manufacturer must incur additional expense involved with the disposal of the wasted sheet steel pieces. Finally, the process of producing the finished stator core from the raw sheet steel is a multiple step process requiring expensive material handling to be performed during and/or between each process step.

U.S. Pat. No. 4,947,065 to Ward et al. disclosed another method for manufacturing a stator core using iron powder particles coated with a thermoplastic material. The method disclosed in U.S. Pat. No. 4,947,065 addresses the disadvantages present in the prior art method of manufacturing a stator core from sheet steel laminations. Scrap is eliminated by the use of a premeasured amount of thermoplastic coated iron particles. The stator core is formed by heating the premeasured amount of the thermoplastic coated iron particles to a predetermined temperature, placing the heated particles into a heated mold that is shaped to produce a stator core of the desired shape, activating a means for compacting the heated particles within the heated mold, thereby compacting the heated particles within the heated mold for a predetermined time at a predetermined pressure. Material handling is reduced because the raw thermoplastic coated iron particle material is manufactured into a finished stator in fewer process steps. The stator core of Ward et al. does not overcome all disadvantages of a prior art stator core made with steel laminations. To fabricate a finished stator from a stator core according to the disclosure of Ward et al., the stator windings must be installed into the slots by a manual means after the stator core is formed, as was required in the stator core made with steel lamination.

Stator windings are conventionally produced from an insulated electrical conductor of types known in the art including, for example, insulated single strand copper wire. The insulated electrical conductor is conventionally formed by methods known in the art into substantially cylindrical winding configurations which will fit within the slots in the stator core, and which will produce the desired electrical effect when the windings are placed in a moving magnetic field, or the desired magnetic effect when the windings are energized with an electric current. The windings are inserted into slots in the stator to maximize the electromagnetic coupling between the windings and the flux path, and to minimize the air gap between the rotor and stator. The portion of the windings which is aligned parallel to the axial direction of the core is conventionally known as the "active portion" of the windings. The portions of the windings which resides outside the stator core at each axial end of the stator core, and which function to conduct electricity from the active portion of the windings which resides in a first slot to the active portion of the windings which resides in a second slot, are conventionally known as the "end turns".

Electric motors and generators operate on the principle of magnetic flux cutting. Electric motors and generators have a source of magnetic flux, such as an electromagnet or a permanent magnet, and a set of windings that intercept the flux. The flux path is always ferromagnetic. The flux is cut when rotation of the rotor occurs. The desired torque and power set the rotor dimension, while the stator dimensions are driven by both the rotor dimension and by the flux return requirements. An important rotor dimension is the "rotor active volume". If "r" is the rotor radius and "l" is the rotor active length, then the rotor active volume "X" is calculated as "$X=(\pi r^2 l)$".

A vehicular alternator is an example of electromagnet based electric generator. In a vehicular alternator, the magnetic flux is generated with a multi-pole electromagnet in the rotor. It is desired in the art to maximize the average magnetic flux density, or the "magnetic loading", of the air gap. The magnetic loading may be limited by magnetic saturation of the stator core. A disadvantage present in prior art stator design using internally slotted stator cores, is that the slots reduce the internal surface area of the stator adjacent to the rotating rotor, thereby reducing the ability for magnetic flux to flow between the stator and the rotor. Due to the reduced internal surface area, the stator core teeth reach magnetic saturation more readily than would a stator core without internal slots. When the stator core teeth saturate, the magnetic flux density in the air gap is limited to the ratio of the tooth width to slot pitch multiplied by the saturation flux density of the stator material. For a typical vehicular alternator stator material the saturation flux density is about 1.5T, and the tooth width to slot pitch ratio is about ½, making the magnetic loading about 0.75T.

Reducing the slot width and increasing the tooth width increases the magnetic loading by increasing the internal surface area of the stator adjacent to the rotating rotor. However, because the slot must carry a fixed total electric current to meet the desired performance characteristics of the electromagnetic device, decreasing slot width requires an increase in slot depth to enable the slot to carry the same total electric current. Increasing the slot depth while maintaining the same total electric current requires increasing the radius of the stator. It is known in the art of motor and generator design to balance magnetic loading and stator dimension in an attempt to find the optimum solution for each application of a particular electromagnetic device.

The magnetic loading of the stator core may be increased without increasing the stator dimensions by fabricating the stator core from a material known in the art to have a higher saturation flux density than steel, such as, for example, an alloy of neodymium iron boron. Such materials improve magnetic loading, but at a substantially higher cost. It is desired to have a stator core fabricated from a readily available, low cost, magnetic material, wherein a higher degree of magnetic loading may be achieved without a corresponding increase in stator size.

Another disadvantage of the prior art stator designs arises from limitations on the amount of electrical current which can be carried in the stator windings installed in a stator slot. The total current carried in the slot is calculated from the current carried in each conductor multiplied by the number of conductors wound into the slot. A typical conductor packing factor for vehicular alternator stators is limited to about 30%, which means that only 30% of the slot volume is occupied by conductors.

It is known in the art that the total current carried in the stator slots, and therefore the conductor packing factor, is limited by the need to dissipate the heat generated by electrical resistance in the conductors. The heat must be dissipated either through the stator core, or through the conductors themselves to the end turns of the conductors. The non-reactive, non-conducting material used to fill the stator slots substantially thermally isolates the conductors from the stator core. As a result, most of the heat must be dissipated through the end turns. The total current carried in the stator slots, and therefore the conductor packing factor, can be significantly increased by providing a direct cooling path through the stator core.

Another disadvantage of the prior art stator designs arises from the significant contribution to stator size made by the end turns of the windings. It is known in the art of vehicular alternator design that end turns add length to a stator while serving no significant power producing function. The end turns are extended to facilitate electric current conduction, and to serve as the heat rejection surface for the windings. The end turns may increase the overall length of a stator by a factor of about 2.5–3 times the active length. It is known in the art that the end turns must be enclosed within the vehicular alternator housing, thus the overall length of the vehicular alternator of this design is increased by similar factor. A stator design wherein the end turns are contained within the volume occupied by the stator core is desirable.

U.S. Pat. No. 5,536,985 to Ward et al. disclosed a rotor assembly wherein the rotor core is comprised of compacted soft magnetic particles coated with a non-magnetic binder, and wherein the rotor windings are embedded within the rotor core. Three methods of manufacturing the rotor assembly are disclosed in U.S. Pat. No. 5,536,985. In the first disclosed method, the rotor core is manufactured by filling a die cavity with a predetermined amount of soft magnetic particles coated with a nonmagnetic binder. The soft magnetic particles within the die cavity are heated at a predetermined temperature and axially compacted for a predetermined time at a predetermined pressure to form the solid rotor core. After the rotor core is removed from the die cavity, preformed discrete rotor windings are embedded into the rotor core in a circular pattern parallel to the axial direction of the core by inserting the discrete rotor windings into preformed holes in the core.

In the second method of manufacturing the rotor assembly disclosed in U.S. Pat. No. 5,536,985, the discrete rotor windings are preformed and inserted into holding devices within a die cavity so that the rotor windings are oriented in a circular pattern parallel to the axial direction of the core. The die cavity then is filled with soft magnetic particles coated with a nonmagnetic binder. The soft magnetic particles and the rotor windings within the die cavity are heated at a predetermined temperature and axially compacted for a predetermined time at a predetermined pressure to form the solid rotor core with the rotor windings embedded therein.

In the third method of manufacturing the rotor assembly disclosed in U.S. Pat. No. 5,536,985, the discrete rotor windings are preformed and inserted into holding devices within a two-part mold comprised of an upper mold part and a lower mold part. The holding devices are included in the lower mold part. The lower mold part containing the rotor windings then is filled with soft magnetic particles coated with a nonmagnetic binder, and the mold is sealed by placing the upper mold part onto the lower mold part. The sealed two-part mold containing the soft magnetic particles and the rotor windings is placed inside a evacuated isostatic compaction chamber. The isostatic compaction chamber is sealed, and the sealed chamber is filled with hydraulic fluid heated to a predetermined temperature, which exerts a predetermined pressure uniformly on all surfaces of the mold. After a predetermined time, the hydraulic fluid is drained from the compaction chamber. The drained chamber is opened and the two-part mold is removed therefrom. The mold is opened destructively to reveal a rotor core with embedded rotor windings.

The performance of an electromagnetic device may be measured by the torque density "D" and power density "Z". These measurements can be derived from the magnetic loading and the electrical loading of the device. The magnetic loading, "B", is the average magnetic flux density of the air gap. The electrical loading "L" is calculated by dividing the total current in the slots "I" by the slot pitch "p". In equation form, it can be represented as "L=(I/p)".

To arrive at the measurements of torque density and power density, several intermediate calculations must be made. First, the tangential force "F" acting on the rotor may be calculated by the equation "F=(BL2πr1)", where "B" is the magnetic loading, "L" is the electrical loading, "r" is the rotor radius, and "1" is the active length of the rotor.

The torque "Y" produced by the rotor may be calculated by the equation "Y=(Fr)", where "F" is the tangential force acting on the rotor, and "r" is the rotor radius. The power "P" produced by the rotor may be calculated may be calculated by the equation "P=(Fv)", where "F" is the tangential force acting on the rotor, and "v" is the rotational speed of the rotor multiplied by the radius of the rotor (known as the "tip speed" of the rotor).

We can normalize the power and torque to the rotor active volume to obtain the torque density and the power density, which are direct measures of performance of the motor or generator. The torque density "D" therefore may be calculated by the equation "D=(Y/(πr²1))", where "Y" is torque, "r" is the rotor radius, and "1" is the active length of the rotor. By algebraically substituting for the variables and then algebraically reducing the equation, an equivalent representation of the equation can be shown as "D=(2BL)", where "B" is the magnetic loading, and "L" is the electrical loading.

The power density "Z" may be calculated by the equation "Z=(P/(πr²1))", where "P" is power, "r" is the rotor radius, and "1" is the active length of the rotor. By algebraically substituting for the variables and then algebraically reducing the equation, an equivalent representation of the equation can be shown as "Z=((2BLv)/r)", where "B" is the magnetic loading, "L" is the electrical loading, "v" is the tip speed of the rotor, and "r" is the rotor radius.

The measurements of power density and torque density will illustrate to those skilled in the art that magnetic loading and electrical loading are fundamental to electromagnetic device performance. An increase in either the magnetic loading or the electrical loading, or both, relates directly to an increase in power density and torque density. Increasing the tip speed and/or decreasing rotor radius also will increase the power density.

It is desired to produce a stator which overcomes the disadvantages present in the prior art. For example, it is desired to produce a stator which may be manufactured economically from readily available ferromagnetic materials with a minimum of waste and a minimum of material handling, which possesses electromagnetic capabilities required by a variety of applications, and which embodies a smaller, more electrically efficient design.

SUMMARY OF THE INVENTION

The present invention is a novel powdered magnetic material electromagnetic device with embedded windings, and a novel method for its manufacture. In one embodiment, the electromagnetic device is a stator. The windings comprise preformed insulated electrical conductors, as are common in prior art electromagnetic device designs. The windings are placed into a compaction die cavity, and the remaining volume of the compaction die is filled with a quantity of powdered magnetic material which is sufficient to fully surround and encapsulate the windings after compaction. Radial compaction is used to compact the powdered magnetic material into a solid magnetic structure with the preformed windings embedded therein. Radial compaction avoids or reduces distortion of the windings during compaction. Radial compaction by the dynamic magnetic compaction method has been found to produce a suitable result. An electromagnetic device with embedded windings according to the present invention will be of sufficient density and physical strength to be a substitute for prior art devices in a variety of applications including, for example, vehicular alternator applications. By embedding the windings within the core, an electromagnetic device according to the present invention may be smaller and of a lesser mass than a prior art device offering similar performance.

DESCRIPTION OF THE DRAWINGS

The features and advantages of this invention, and the manner of attaining them, will be more apparent and better understood by reference to the following descriptions of embodiments of the invention taken in conjunction with the accompanying drawings, wherein.

DESCRIPTION OF THE INVENTION

The present invention is a novel method for manufacturing a stator core from powdered magnetic material, and embedding stator windings within the stator core, and a novel powdered magnetic material stator core with embedded stator windings produced by the method.

Figure 1:
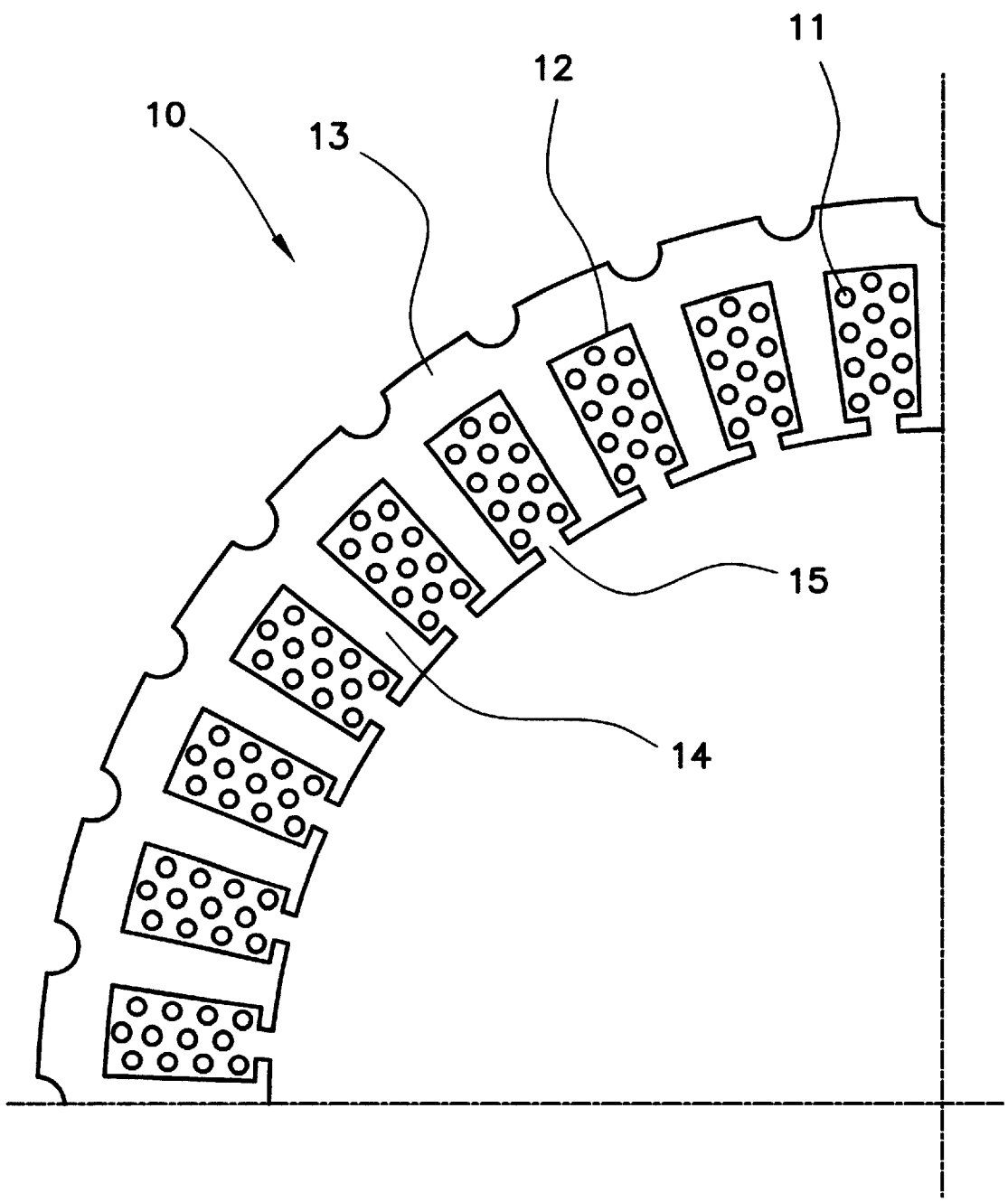
FIG. 1 is a cross-sectional view of one-quarter of a stator according to the prior art.

To better illustrate the advantages of the present invention, it is useful to examine a stator made according to the prior art methods. FIG. 1 shows one-quarter of a cross-section of such a prior art stator. In FIG. 1, stator 10 is shown with a plurality of windings 11 installed in a plurality of slots 12. Stator core 13 is fabricated from a plurality of stacked steel laminations (only the top lamination being shown in FIG. 1). Stator core 13 includes a plurality of teeth 14 which define the slots 12. Windings 11 were shaped into the desired configuration prior to installation into stator core 13. During installation into stator core 13, windings 11 were inserted into slots 12 through slot openings 15.

Figure 2:
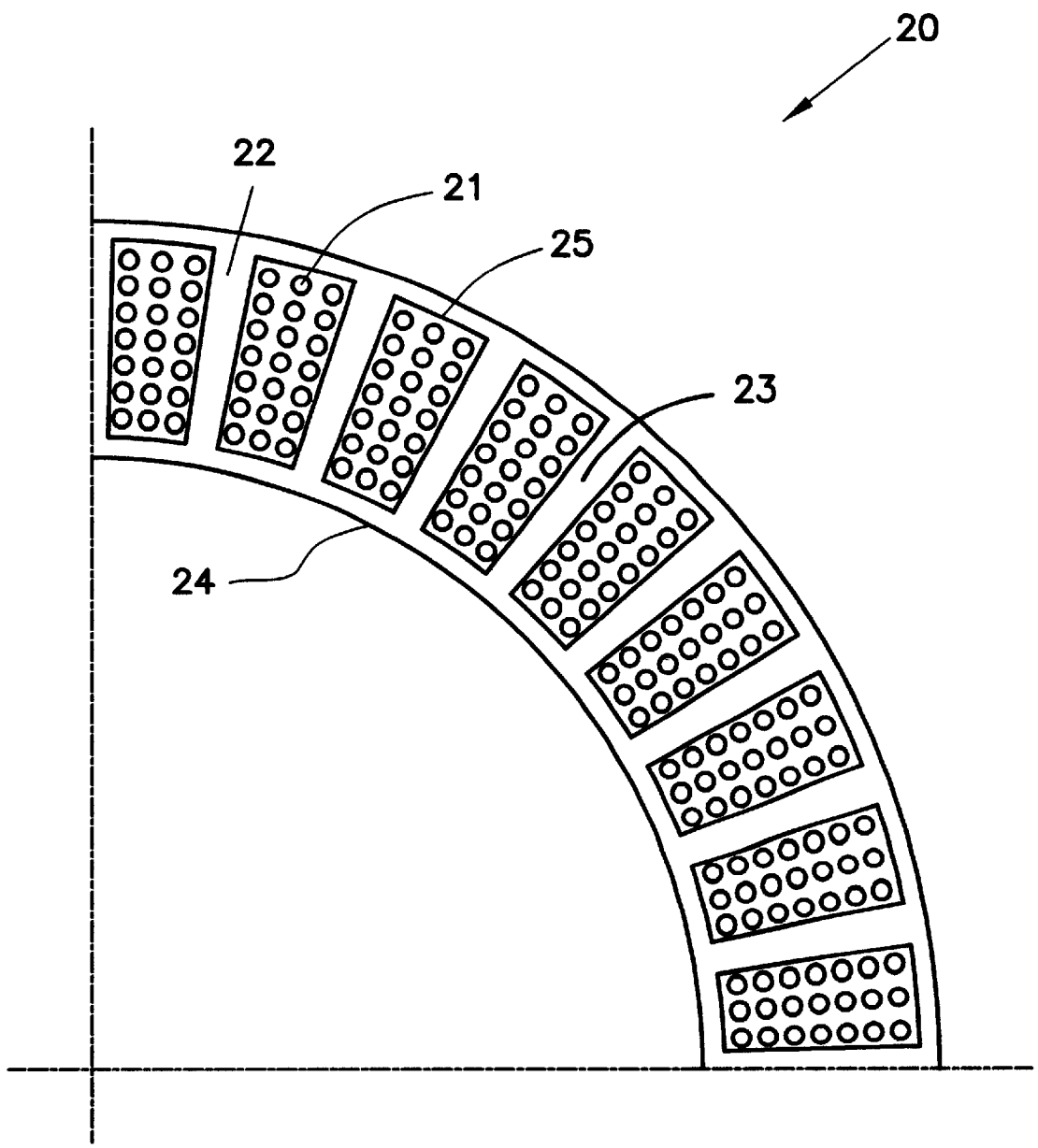
FIG. 2 is a cross-sectional view of one-quarter of one embodiment of a stator according to the present invention.

FIG. 2 shows one-quarter of a cross-section of one embodiment of a stator according to the present invention. In FIG. 2, stator 20 is shown with a plurality of windings 21 embedded therein. Stator core 22 of this embodiment is fabricated from powdered magnetic material. As in the prior art, windings 21 are shaped into the desired configuration prior to being surrounded with the powdered magnetic material which comprises stator core 22. Stator core 22 includes a plurality of slots 25 in which windings 21 reside. A plurality of teeth 23 separates the plurality of slots 25. Unlike the prior art, stator core 22 has a continuous inner surface 24, with no slot openings.

In this embodiment of the present invention, the stator windings 21 are produced from wire of a desired gauge, the wire comprising a single strand copper conductor pre-coated with insulation. The insulation must be rated to withstand 200° C. In this embodiment, Phelps Dodge Industries GP/MR-200® brand wire or equivalent may be used. In the preferred embodiment, the wire gauge typically will be AWG-13 or smaller.

The wires are preshaped by methods known in the art into the desired stator winding configuration. For example, the wires may be shaped to form a complete multiple phase stator winding, or may be shaped form separate single phase stator windings which subsequently may be combined into a multiple phase configuration, if the desired application so requires. Because a stator produced according to the present invention will have a smaller radius and shorter axial length than a stator produced by prior art methods, less wire is used in the manufacture of a stator according to the present invention than in prior art methods. This reduces the cost of the finished stator, and also reduces the mass of the finished stator.

During the compaction step of the method of present invention (discussed in more detail hereinafter), windings 21 will be exposed to compaction pressures above the pressure at which the common wire insulation polymers will begin to flow. If the insulation fails during the compaction process exposing the center conductor, the electrical integrity of the stator will be compromised and the stator must be scrapped. To reduce insulation stresses during compaction, and to improve the conductor packing factor, the plurality of wires comprising the active portion of windings 21 should be substantially parallel to each other. In addition, crossovers of individual wires in the end turn region of stator 20 should be minimized. Windings 21 may be taped to reduce the chance of movement during handling and compaction, but this is not required.

The wires in the finished stator must bond to one another and to the powdered iron. In one embodiment of the present invention, this will occur due to changes to the surface of the wire insulation polymer under the pressures and temperatures achieved during compaction. In another embodiment, a binder coating of a type known in the art, such as Phelps Dodge Industries BONDEZE® M, may be applied to the insulation coating to promote the bonding between the wires, and between the wires and the powdered iron. Alternatively, a thermoset resin, such as a "B" stage epoxy, may be applied. The thermoset resin must be of a type which does not set before compaction.

After windings 21 are shaped into the desired configuration, they are placed in a compaction die cavity. The compaction die cavity is sized to receive windings 21 and the amount of powdered magnetic material required to produce a finished stator of the desired dimensions. After windings 21 are in place within the compaction die cavity, the remaining volume of the compaction die cavity is filled with powdered magnetic material.

The powdered magnetic material fill step of this embodiment of the present will result in a powdered magnetic material fill density of about 50% before compaction. To match the powdered magnetic material "shrinkage" during compaction, windings 21 should be produced with initial conductor packing factor of about 50%. In another embodiment of the present invention, a higher packing factor, such as, for example, 75% may be used, provided the wire insulation is of a type that can withstand powdered magnetic material flow past it during compaction. In other embodiments of the present invention, flow enhancers can be added to the powdered magnetic material or the wires can be lubricated to reduce the likelihood of insulation damage during compaction of the powdered magnetic material.

In one embodiment of the present invention, the powdered magnetic material is "composite iron". Composite iron is comprised of iron alloy powder coated with a thermoplastic material or a thermoset material. The particle sizes of the iron alloy powder used in one embodiment of the present invention range from about 44 to about 250 microns. A small percentage of this iron alloy powder may have a particle size as small as about 10 microns. The iron alloy powder used in this embodiment is about 99.7% Fe, 0.003% C, 0.0005% N, 0.006% S, and 0.004% P by weight.

The iron alloy powder particles are either coated with a thermoplastic material or a thermoset material, or the thermoplastic material or a thermoset material is admixed with the iron alloy powder to form the basic composite iron. The magnetic, thermal, and mechanical properties of the composite iron are interrelated through iron alloying, particle morphology, particle size, thermoplastic material or thermoset material type, and the ratio by weight of the iron alloy to the thermoplastic material or to the thermoset material.

The thermoplastic material in one embodiment of the present invention may be an amorphous thermoplastic polyethermide resin, an example of which is a General Electric ULTEM® resin. The thermoplastic material used in this embodiment may be replaced in other embodiments of the present invention by a thermoset material, such as polyethersulfone ("PES") and/or PPS. Other commercially available materials which possess similar properties may be used.

To prepare the composite iron, the particles of iron alloy powder in this embodiment of the present invention are coated with a thin layer of the thermoplastic material. If the thermoplastic material is not liquid under ambient conditions, it must be liquefied. In one embodiment, the thermoplastic material is mixed with a solvent to provide a liquid material. In another embodiment, the thermoplastic material is heated until liquefaction.

In one embodiment of the present invention, the iron alloy powder is coated with the thermoplastic material when it is blown by compressed air up through a vertical tube and, at the same time, the liquid thermoplastic material is sprayed on the blown iron alloy powder to coat the powder. The coated iron alloy powder falls outside the tube and is directed back into an inlet of the tube where it is blown up again and coated again. After a number of passes through the tube, the particles of iron alloy powder are coated to the extent desired. If a solvent has been used to liquefy the thermoplastic material, the solvent evaporates or is recovered during this process.

To provide output performance, power, and torque comparable to a stator core structure formed from steel laminations, the proportions of iron alloy powder and thermoplastic material in the finished stator core should fall within certain ranges. In one embodiment of the present invention, the stator core structure should be approximately between 95 to 99.9% iron alloy powder by weight, with the remaining weight comprised substantially by the thermoplastic material. Since about 1% by weight of thermoplastic material used in this embodiment is equal to about 4% by volume, a stator core structure of this embodiment that is approximately 99% iron alloy powder by weight and approximately 1% thermoplastic by weight, would be in the range of approximately 96% iron alloy powder by volume and approximately 4% thermoplastic material by volume.

In the final molded state, the thermoplastic material is bonded to the outer surface of each iron alloy powder particle so that the particles within the finished stator core are insulated from each other by thin layers of thermoplastic material. In addition, the thermoplastic material surrounding each iron alloy particle will bond to the thermoplastic material surrounding adjacent iron alloy particles, creating the stator core structure. Those skilled in the art will appreciate that, since the thermoplastic material separates the particles, there are gaps formed between the particles.

These gaps act like air gaps, since the thermoplastic material separating the particles has about the same magnetic permeability as air. This gap effect increases resistivity and, consequently, reduces eddy current loses.

To produce the finished stator core 20, the powdered magnetic material surrounding windings 21 must be compacted within the compaction die cavity to form the powdered magnetic material into the solid stator core 22. A stator core produced with powdered magnetic material compacted by conventional means, such as the axial means or the isostatic means used to produce the rotor disclosed in U.S. Pat. No. 5,536,985, can achieve densities of only approximately 95% of full density under optimal circumstances. The permeability and saturation flux density of a stator core produced from conventionally compacted powdered magnetic material of this density both are significantly lower than that of steel laminations. A stator core produced from conventionally compacted powdered magnetic material also is significantly weaker than a stator core produced from steel laminations, often resulting in damage during handling. For a stator core produced from compacted powdered magnetic material to be a practical alternative to a stator core produced from steel laminations, higher densities must be achieved. The magnetic properties of a stator core fabricated from compacted powdered magnetic material improve with density. The mechanical and thermal performance of compacted powdered magnetic material increases with density.

To achieve an optimal finished stator, the powdered magnetic material surrounding windings 21 must be compacted in a way which does not result in buckling and distorted geometry in the active portion of windings 21. If the geometry of the preformed windings 21 is altered, the electromagnetic characteristics of stator 20 will be changed. Compacting the powdered magnetic material by the axial compaction method or the isostatic method disclosed in U.S. Pat. No. 5,536,985 will cause the active portion of windings 21 to buckle and distort. To prevent buckling and distortion in the active portion of windings 21, the powdered magnetic material surrounding windings 21 must be compacted radially.

In one embodiment of the present invention, the necessary stator core density and undisturbed windings geometry may be achieved by radially compacting the powdered magnetic material using the dynamic magnetic compaction ("DMC") process disclosed by Chelluri et al. in U.S. Pat. No. 5,405, 574, and in U.S. Pat. No. 5,689,797. DMC provides two advantages over prior art compaction techniques. First, powdered metal structures compacted by DMC are more dense than powdered metal structures compacted by other compaction techniques known in the art. DMC can produce a nearly fully dense powdered magnetic material stator core. High density is required to withstand the mechanical and thermal stresses, and to provide the magnetic performance necessary to make powdered magnetic material a viable substitute for steel laminations in stator fabrication. The second advantage provided by DMC is that DMC enables radial compaction of the powder magnetic material. Prior art devices employing embedded windings used axial compaction or isostatic compaction, neither of which is suitable for the present invention. Both would result in an unacceptable distortion of the stator windings during compaction of the powdered magnetic material. An alternate means of radial compaction may be used if the means is capable of producing a powdered magnetic material stator core of the required density.

The most critical areas of magnetic performance are the teeth 23 of stator 20. Teeth 23 also are high mechanical and thermal stress areas, so mechanical and thermal stress resistance must be maximized in teeth 23. The radial compaction inherent in DMC promotes powdered magnetic material powder flow into the teeth during compaction to maximize densification, thereby improving magnetic performance, and mechanical and thermal stress resistance.

Figure 3:
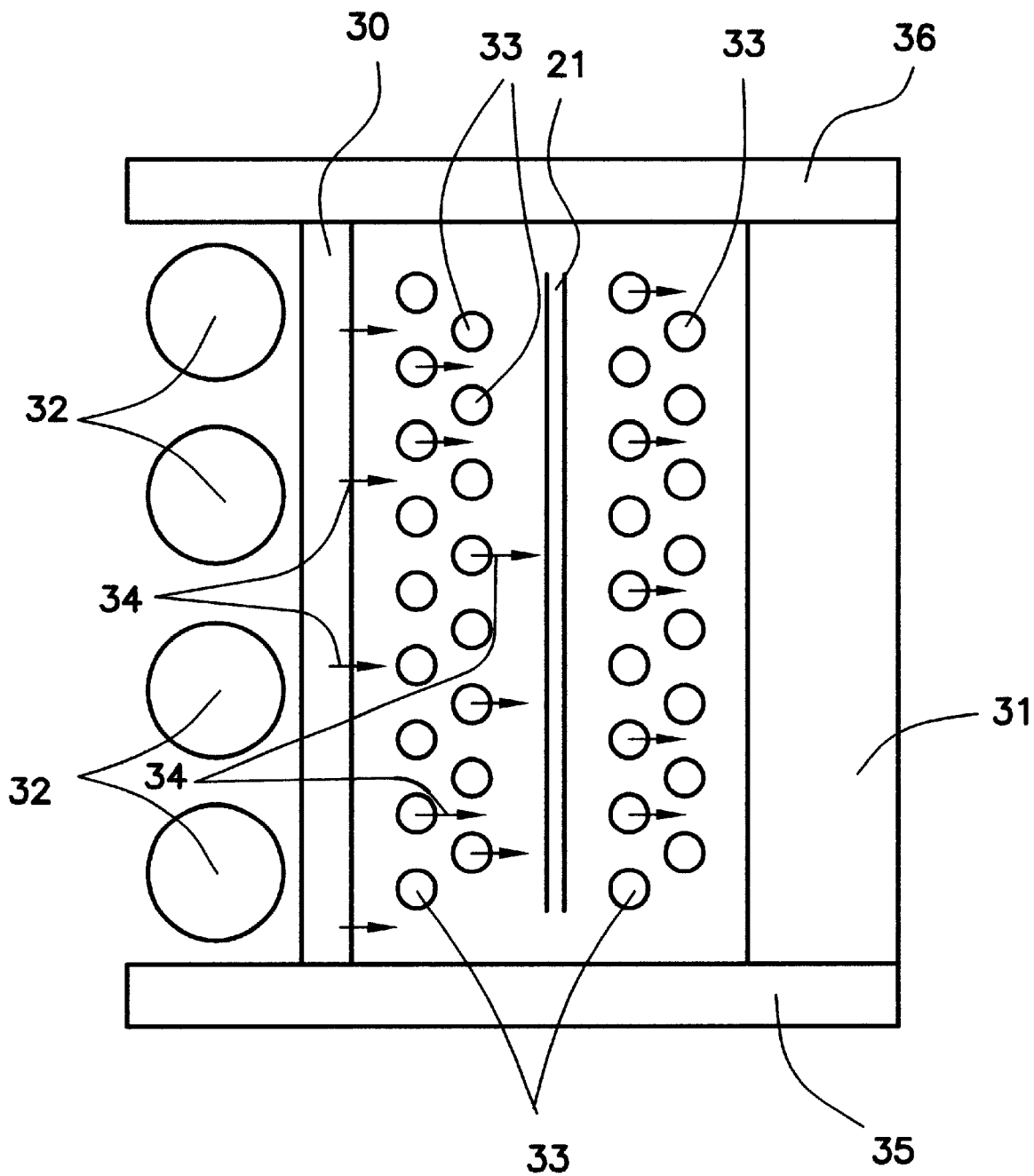
FIG. 3 is a cross-sectional view of a dynamic magnetic compaction apparatus and concept.
Figure 4:
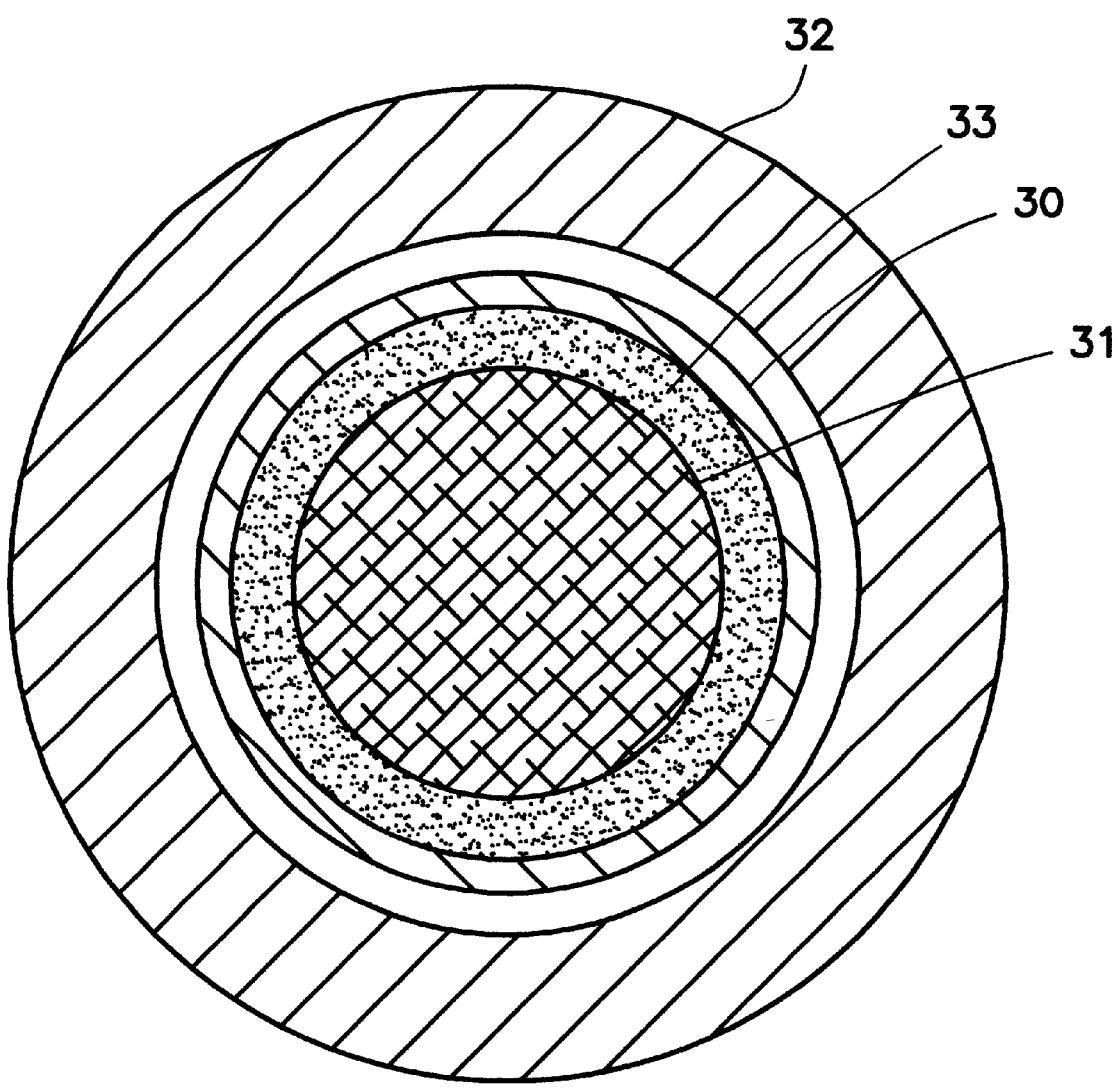
FIG. 4 is a top view of the dynamic magnetic compaction apparatus of FIG. 3.

FIG. 3 shows a cross-sectional view of a typical DMC apparatus. FIG. 4 shows a top view of the DMC apparatus of FIG. 3, after compaction is complete. In FIG. 3 and FIG. 4, a compaction die cavity is formed by an electrically conductive outer compaction container 30, an inner die core 31, a die cavity floor 35, and a removable die cavity lid 36. A coil 32 surrounds outer compaction container 30. Inner die core 31 is solid, cylindrical and has an outer diameter equal to the desired inner diameter of the stator. The compaction die cavity is sized to receive windings 21 and a predetermined amount of powdered magnetic material particles 33. The DMC apparatus also possesses a means for permitting the release of air from the compaction die cavity during compaction (not illustrated in FIG. 3 or FIG. 4). This air release means is sized to prevent the release of powdered magnetic material during compaction.

In operation, die cavity lid 36 is removed and windings 21 are placed in the desired position within the compaction die cavity. The remaining volume of the compaction die cavity is filled with powdered magnetic material particles 33. Die cavity lid 36 is replaced. A short pulse (typically less than 1 ms) of a very large electrical current (approximately 40,000–60,000 amps) is conducted through coil 32, producing a high magnetic field (typically 30–40T), which in turn produces strong magnetic forces (represented by arrows 34) in the radial direction of the coil 32 and inward on the electrically conductive outer compaction container 30. Outer compaction container 30 is collapsed radially inwardly, compacting the powdered magnetic material particles 33 into a solid powdered magnetic material structure, and embedding windings 21 within the solid powdered magnetic material structure.

Inner die core 31, die cavity floor 35, and removable die cavity lid 36 must be able to withstand the compaction forces generated by coil 32 without distorting or changing position relative to each other. The magnetic forces produced by coil 32 force the powdered magnetic material particles 33 together within the compaction die cavity, forming a very dense solid powdered magnetic material structure. The windings 21 may move slightly inward toward the inner die core 31 because of the magnetic forces 34, but this movement may be anticipated and compensated for in the design of the DMC apparatus and windings 21, and in the placement of the windings 21 within the compaction die cavity. After compaction, outer compaction container 30 is removed destructively, revealing the finished stator 20.

Those skilled in the art will be appreciate that the above described methods of manufacture are embodied by the process comprising the steps of (a) shaping an insulated conductor of a desired gauge into stator windings 21 of a desired configuration; (b) placing stator windings 21 into a compaction die cavity; (c) filling the remaining volume of the compaction die cavity with a predetermined quantity of powdered magnetic material particles 33; and (d) radially compacting the powdered magnetic material particles 33 to cause the powdered magnetic material particles 33 to bind together into a solid powdered magnetic material structure with windings 21 embedded therein.

Figure 5:
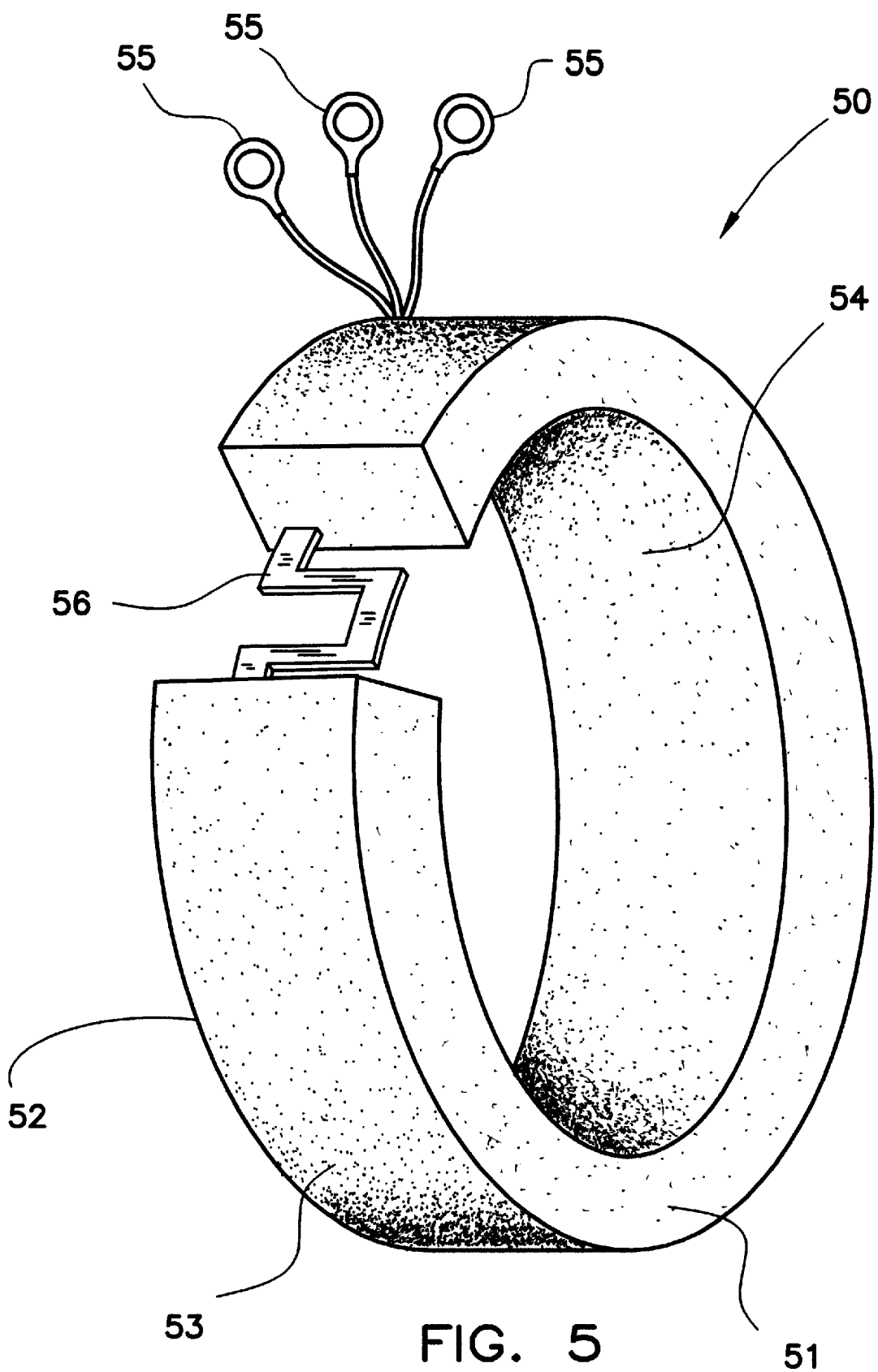
FIG. 5 is a perspective partially fragmentary view of a finished stator according to the present invention.

FIG. 5 shows a perspective partially fragmentary view of a stator according to the present invention. In FIG. 5, stator 50 is shown having a first flat axial end surface 51, a second flat axial end surface 52, an outer annular surface 53, an inner annular surface 54, and a plurality of electrical connector leads 55. The missing fragment reveals a conceptual representation of stator windings 56. The stator windings, including the end turns, are fully enclosed within the core of stator 50. The only exposed electrical conductors are electrical connector leads 55, which pass through the surface of stator 50 and electrically connect to the embedded stator windings 56. In preferred embodiments, the electrical connector leads 55 may pass through either the first axial end surface 51, the second axial end surface 52, or the outer annular surface 53.

For a stator slot carrying a given total current, the present invention enables the conductor packing factor to be increased from about 30%, which was typical of the prior art, to greater than 90%. The conductor packing factor is increased by reducing the size of the stator slot. The air is virtually eliminated from the stator slot. Several advantages of the present invention accrue from the reduced stator slot size.

First, the reduced stator slot size enables the diameter of the. inner surface 54 and the diameter of the outer surface 53 to be reduced without affecting the magnetic loading. Reducing the diameter of the inner surface 54 of the stator enables the rotor radius to be reduced correspondingly. For a given total current and a given magnetic loading, a smaller rotor radius results in an increase in power density. It may be necessary to increase the rotor's rotational speed to maintain a rotor tip speed adequate to sustain the increase in power density.

Second, the reduced stator slot size results in a reduced stator slot pitch. For a given total current, a smaller slot pitch results in an increase in electrical loading. For a given magnetic loading, an increase in electrical loading results in an increase in torque density and in power density.

In prior art stators, the heat generated by electrical resistance in the windings is primarily conducted to the end turns and rejected to the air from the end turns via either natural or forced convection. The low conductor packing factor and use of non-reactive, non-conductive material to fill the stator slots essentially prevents thermal conduction to the stator core. In a stator according to the present invention, the conductor packing factor is higher and there is no material thermally insulating the conductors from the stator core. The complete windings, including end turns, are embedded in the stator core. All the resistive losses are conducted through the core and rejected from the surfaces of the stator. In an alternate embodiment, the thermal conductivity of the stator core may be enhanced by the addition of high thermal conductivity carbon fibers to the composite iron before compaction.

Those skilled in the art will be appreciate that the foregoing method will produce a stator containing embedded windings which is suitable for use in many applications, such as, for example, in vehicular alternator applications. It will be further appreciated by those skilled in the art that a stator according to the present invention will produce output performance, power, and torque equivalent to that produced by a stator fabricated from slotted steel laminations, but with smaller overall dimensions and lower mass. Production waste is reduced in the present invention by fabricating the stator core from powdered magnetic material instead of steel laminations. Production cost also is reduced in the present invention by reducing production waste, and by reducing the material handling required during stator fabrication.

While this invention has been described as having a preferred design, the present invention can be further modified within the scope and spirit of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A electromagnetic device comprising:
   one or more electrical conductors shaped into windings of an electromagnetic device in a substantially cylindrical configuration, wherein each adjacent conductor of said windings is electrically insulated from each other adjacent conductor;
   a cylindrical body comprising a plurality of radially compacted powdered magnetic material particles bound together due to compaction, surrounding and solidly enclosing said one or more conductors therein, said cylindrical body being electrically insulated from said one or more conductors, said cylindrical body circumscribed by a continuous substantially cylindrical interior surface and a continuous substantially cylindrical exterior surface substantially concentric therewith, a first axial end surface connected between one edge of said continuous substantially cylindrical interior surface and one edge of said continuous substantially cylindrical exterior surface, and a second axial end surface connected between the other edge of said continuous substantially cylindrical interior surface and the other edge of said continuous substantially cylindrical exterior surface, said second axial end surface being opposite to and substantially parallel to said first axial end surface,
   a plurality of electrical connector leads beginning outside said cylindrical body and passing through at least one of the surfaces of said cylindrical body, said plurality of electrical connector leads electrically connected to said one or more conductors.

2. The electromagnetic device of claim 1, wherein the percentage of the volume of each of the plurality of said hollow slots occupied by said one or more electrical conductors exceeds about 90%.

3. The electromagnetic device of claim 1, wherein said electrical conductors are shaped into single phase stator windings.

4. The electromagnetic device of claim 1, wherein said electrical conductors are shaped into multiple phase stator windings.

5. The electromagnetic device of claim 1, wherein said powdered magnetic material comprises composite iron.

6. The electromagnetic device of claim 5, wherein the composite iron comprises between about 95% and about 99.9% iron alloy material by weight.

7. The electromagnetic device of claim 5, wherein said composite iron comprises an iron alloy material coated with a thermoplastic material.

8. The electromagnetic device of claim 5, wherein said composite iron comprises an iron alloy material coated with a thermoset material.

9. The electromagnetic device of claim 5, wherein said powdered magnetic material is radially compacted using dynamic magnetic compaction.

10. The electromagnetic device of claim 1, wherein said electromagnetic device comprises a stator, and wherein said powdered magnetic material particles are compacted to a density which is at least about 95% of the density of steel used in a conventional stator comprising steel laminations.

11. A electromagnetic device comprising:
   one or more electrical conductors shaped into windings of an electromagnetic device in a substantially cylindrical configuration, wherein each adjacent conductor of said windings is electrically insulated from each other adjacent conductor;
   a cylindrical body comprising a plurality of radially compacted powdered magnetic material particles comprising carbon fibers, said powdered magnetic material bound together due to compaction surrounding and solidly enclosing said one or more conductors, said cylindrical body being electrically insulated from said one or more conductors, said cylindrical body circumscribed by a continuous substantially cylindrical interior surface and a continuous substantially cylindrical exterior surface substantially concentric therewith, a first axial end surface connected between one edge of said continuous substantially cylindrical interior surface and one edge of said continuous substantially cylindrical exterior surface, and a second axial end surface connected between the other edge of said continuous substantially cylindrical interior surface and the other edge of said continuous substantially cylindrical exterior surface, said second axial end surface being opposite to and substantially parallel to said first axial end surface; and
   a plurality of electrical connector leads beginning outside said cylindrical body and passing through at least one of the surfaces of said cylindrical body, said plurality of electrical connector leads electrically connected to said one or more conductors.

12. The electromagnetic device of claim 11, wherein said electrical conductors are shaped into single phase stator windings.

13. The electromagnetic device of claim 11, wherein said electrical conductors are shaped into multiple phase stator windings.

14. The electromagnetic device of claim 11, wherein said powdered magnetic material comprises composite iron.

15. The electromagnetic device of claim 14, wherein the composite iron comprises between about 95% and about 99.9% iron alloy material by weight.

16. The electromagnetic device of claim 14, wherein said composite iron comprises an iron alloy material coated with a thermoplastic material.

17. The electromagnetic device of claim 14, wherein said composite iron comprises an iron alloy material coated with a thermoset material.

18. The electromagnetic device of claim 11, wherein said powdered magnetic material is radially compacted using dynamic magnetic compaction.

19. The electromagnetic device of claim 11, wherein said electromagnetic device comprises a stator, and wherein said powdered magnetic material particles are compacted to a density which is at least about 95% of the density of steel used in a conventional stator comprising steel laminations.

20. A method for fabricating a electromagnetic device comprising the steps of:
   shaping an insulated electrical conductor into a predetermined configuration of windings for an electromagnetic device;
   placing the shaped windings into a compaction die cavity dimensioned and shaped to form the exterior of the electromagnetic device;
   said powdered magnetic material capable of being bound together to form a solid structure upon compaction so that said windings are surrounded with said powdered magnetic material; and
   radially compacting said powdered magnetic material within said compaction die cavity with sufficient force to cause said powdered magnetic material to bind together into a solid magnetic structure with said shaped windings embedded therein.

* * * * *